(12) United States Patent
Rukavina

(10) Patent No.: US 8,530,542 B2
(45) Date of Patent: Sep. 10, 2013

(54) AUTOMOTIVE WINDOW INTERLAYER WITH SOLAR CONTROL PROPERTIES

(75) Inventor: Thomas G. Rukavina, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 737 days.

(21) Appl. No.: 11/652,749

(22) Filed: Jan. 12, 2007

(65) Prior Publication Data

US 2008/0171808 A1 Jul. 17, 2008

(51) Int. Cl.
*C04B 26/12* (2006.01)
*A01G 9/14* (2006.01)

(52) U.S. Cl.
USPC ............ 523/135; 524/408; 428/426

(58) Field of Classification Search
USPC .......... 428/328, 426, 480, 424; 524/408; 260/28; 106/10; 523/135
See application file for complete search history.

(56) References Cited

U.S. PATENT DOCUMENTS

| | | | |
|---|---|---|---|
| 3,509,015 A * | 4/1970 | Ammons et al. | 428/425.6 |
| 3,766,205 A * | 10/1973 | Hansjorg et al. | 548/261 |
| 3,971,864 A * | 7/1976 | Beestrice et al. | 428/38 |
| 5,830,568 A * | 11/1998 | Kondo | 428/328 |
| 6,921,509 B2 * | 7/2005 | Moran et al. | 264/173.16 |
| 2006/0154049 A1 | 7/2006 | Padiyath et al. | |
| 2006/0269739 A1* | 11/2006 | Phillips et al. | 428/328 |

FOREIGN PATENT DOCUMENTS

WO  WO 02/41041 A2  5/2002

OTHER PUBLICATIONS

Ultraviolet Stabilizer, UV absorber UV—328 (Tinuvin 328). Guangshou Zongyuan New materials, Co. LTD., pp. 1-4, 1999.*
U.S. Appl. No. 11/652,748, filed Jan. 12, 2007, Rukavina.
U.S. Appl. No. 11/652,750, filed Jan. 12, 2007, Rukavina.
U.S. Appl. No. 11/652,751, filed Jan. 12, 2007, Rukavina et al.
PCT Search Report dated May 7, 2008 for International Application No. PCT/US2008/050700 filed Jan. 10, 2008.

* cited by examiner

*Primary Examiner* — Hannah Pak
(74) *Attorney, Agent, or Firm* — Andrew C. Siminerio

(57) ABSTRACT

A method for forming an interlayer having improved solar control properties is disclosed. The method includes: a) forming a polymer material from a reaction mixture; b) adding one or more solar control components to the reaction mixture while the polymer material is being formed; and c) curing the reaction mixture.

15 Claims, No Drawings

AUTOMOTIVE WINDOW INTERLAYER WITH SOLAR CONTROL PROPERTIES

FIELD OF THE INVENTION

The present invention is a novel interlayer and a laminated window that contains such an interlayer; specifically a laminated window that exhibits improved solar control properties.

CROSS-REFERENCE TO RELATED APPLICATIONS

This application is related to U.S. application Ser. No. 11/652,748 entitled "Automotive Window, High Impact Interlayer", U.S. application Ser. No. 11/652,750 entitled "Method For Forming A Laminated Window That Can Exhibit A Variable Level Of Adhesion", U.S. application Ser. No. 11/652,751 entitled "Window Interlayer With Sound Attenuation Properties", all three applications filed concurrently herewith, and all three applications incorporated by reference in their entirety.

BACKGROUND

Laminated windows are made up of multiple plies, e.g. two plies, made of glass, plastic, or glass/plastic substrates that sandwich one or more interlayers. The windows are widely used in automotive front windshields and sidelights. Typically, laminated windows must exhibit one or more of the following properties: (1) high impact energy absorption; (2) shear and tear strength sufficient to prevent rupture of the interlayer by broken glass; (3) sufficient adhesion between the interlayer and the glass to prevent dispersion of broken glass; and/or (4) good optical qualities.

When used in a vehicle, a laminated window may need to exhibit additional properties such as, but not limited to, (a) resistance to ballistics, blast, and wind pressures, (b) sound reduction and/or (c) solar control properties depending on the application. A conventional way to change the properties of a laminated window is to modify the composition and/or configuration of the interlayer(s).

Traditional laminated windows have a polyvinyl butyral (PVB) interlayer that includes various plasticizers. Different plasticizers are added to the PVB to change the properties of the interlayer.

One of the drawbacks of a laminated window having a PVB interlayer is cost. In order to be formed into a sheet that can be used as an interlayer in a laminated window, PVB must first be extruded. Extrusion is the process of converting plastic pellets into cut-to-size sheets of plastic using specialized equipment that subjects the pellets to both heat and pressure. Extrusion can be an expensive process.

It would be desirable to have a laminated window that includes an interlayer that can be formed via a non-extrusion process, such as a cast-in-place process or a reaction injection molding (RIM) process. The present invention provides such an interlayer. The interlayer of the present invention comprises a polymer material that can be incorporated into a laminated window. The laminated window of the present invention exhibits good solar control properties.

SUMMARY OF THE INVENTION

In a non-limiting embodiment, the present invention is a method for forming an interlayer comprising: a) forming a polymer material from a reaction mixture; b) adding one or more solar control components to the reaction mixture while the polymer material is being formed; c) and curing the reaction mixture.

In another non-limiting embodiment, the present invention is a method for forming a laminated window comprising: a) assembling a mold comprising two plies that make up a laminated window, the plies being a predetermined distance apart; b) filling the mold with a reaction mixture for forming a polymer material; c) adding one or more solar control components to the reaction mixture while the polymer material is being formed; and d) curing the reaction mixture.

DETAILED DESCRIPTION OF THE INVENTION

All numbers expressing dimensions, physical characteristics, quantities of ingredients, reaction conditions, and the like used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 7.8, 3.0 to 4.5, and 6.3 to 10.0.

As used herein, spatial or directional terms, such as "left", "right", "inner", "outer", "above", "below", "top", "bottom", and the like, are understood to encompass various alternative orientations and, accordingly, such terms are not to be considered as limiting.

The present invention is a method of making an interlayer. The first step in making the interlayer involves forming a polymer material from a reaction mixture. The polymer material can comprise urethane monomers, acrylic monomers or both. In one non-limiting embodiment, the polymer material includes at least one of a polyurethane, a polyurethane acrylic, a polyacrylate, or mixtures thereof. The polymer material is formed in a conventional manner by reacting the required materials (i.e., the reaction mixture) as is well known in the art. In a non-limiting embodiment of the invention, the polymer material has a modulus of elasticity ranging from 500 psi to 200,000 psi. The modulus of elasticity of the polymer material determines what sound frequency will be absorbed by the material.

According to the present invention, a next step in making the interlayer involves, while the polymer material is being formed, adding one or more "solar control components" to the reaction mixture. Depending on the physical properties of the solar control component, the component will either dissolve in or disperse in the reaction mixture.

In a non-limiting embodiment of the invention, the solar control component comprises nanosized particles. The nanosized particles can be added to the reaction mixture in any desired amount. In a non-limiting embodiment of the invention, the nanosized particles are added to the reaction mixture in an amount ranging from 1 to 20 wt. % of the reaction mixture. The nanosized particles can be any shape and have a longest dimension of no greater than 100 nm, such as no greater than 50 nm.

In one non-limiting embodiment, where the solar control component comprises nanosized particles, the nanosized particles comprise a metal or a metal oxide semiconductor or mixtures thereof, such as, but not limited to, gold, silver, indium tin oxide, antimony tin oxide, zinc oxide and zinc stannate. The metals reflect solar energy, and the metal oxides absorb solar energy.

In another non-limiting embodiment, the nanosized particles comprise lanthanum hexaboride ($LaB_6$). $LaB_6$ is well known in the art as an infrared absorber with an absorption band centered on 900 nm.

In another non-limiting embodiment of the invention, the solar control component comprises organometallic tungsten. For example, the organometallic tungsten can include dibutyltungsten phosphate and phosphate groups, which are well known in the art for absorbing infrared radiation. The organometallic tungsten can range from 0.5 to 3 wt. % of the reaction mixture.

In yet another non-limiting embodiment of the invention, the solar control component comprises molybdenum dibutyl phosphate. Molybdenum dibutyl phosphate is well known in the art as an ultraviolet (UV) light absorber. The molybdenum dibutyl phosphate can range from 0.5 to 4 wt. % of the reaction mixture.

In yet another non-limiting embodiment of the invention, the solar control component comprises a UV absorber of the hydroxyphenylbenzotriazole class, such as Tinuvin® 328, which is commercially available from Ciba Specialty Chemicals (Tarrytown, N.Y.). The UV absorber can range from 0.5 to 4 wt. % of the reaction mixture.

According to the present invention, a next step in making the interlayer involves curing the reaction mixture. The reaction mixture can be cured by thermal curing, curing using UV light, or a combination of thermal and UV curing. The exact technique that will be used to cure the reaction mixture as well as the specifics of the technique depends on (a) the contents of the reaction mixture and (b) the solar control component(s) that were added to the reaction mixture, as is well appreciated in the art. For example, if the reaction mixture includes unreacted acrylate groups, UV curing can be used.

In a non-limiting embodiment, the interlayer of the invention is in the form of a sheet having a thickness ranging from 30 mils to 1 inch (0.076 cm to 2.54 cm). Thinner and thicker sheets can be used depending upon the application.

The present invention also encompasses a method for forming a laminated window comprising the interlayer described above sandwiched between two transparent plies. Typically, the plies are made of glass, plastic, or one of each, as is well known in the art.

According to the present invention, the interlayer is made at the same time the laminated window is being made. In this embodiment, the interlayer is made via a casting or reaction injection molding (RIM) process as is well known in the art. The first step in the method of forming the laminated window of the invention comprises assembling a mold (also referred to as a "cast" in the art) between the two plies that will make up the laminated window. The cast can be made of any materials and in any way known in the art. In a non-limiting embodiment of the invention, the cast comprises two plies that are spaced apart at a predetermined distance equal to the desired thickness of the interlayer.

According to the present invention, a next step in the method for forming the laminated window involves filling the cast with the reaction mixture for making the polymer material as described above. In a non-limiting embodiment, the filling step comprises pouring or pumping at least partially uncured polyurethane material into the cast.

According to the present invention, a next step in the method for forming the laminated window involves, while the polymer material is being formed, adding one or more "solar control components" to the reaction mixture. Suitable solar control components are discussed above.

According to the present invention, a next step in the method for forming a laminated window involves curing the reaction mixture. The curing step is accomplished in the manner described above.

The present invention also encompasses a laminated window formed from the method described above. The laminated window includes the interlayer described above sandwiched between two transparent plies. Typically, the plies are made of glass, plastic, or one of each, as is well known in the art. In a non-limiting embodiment of the invention, the laminated window comprises more than one interlayer. The laminated window of the present invention can be used in various automotive, architectural and aerospace applications. For example, the laminated window can be used as an automotive windshield, an automotive sidelight, an aircraft window, storefront display windows, sky lights, etc.

When the laminated window of the present invention is used in an automotive and airplane window, it may need to meet certain performance requirements.

In a non-limiting embodiment, a laminated window incorporating the interlayer of the present invention exhibits a visible light transmittance ranging from 70% to 90% and no greater than 0.5% haze as measured by a haze-gloss meter sold by BYK-Gardner USA (Columbia, Md.). The interlayer should also exhibit consistent mechanical properties up to a temperature of 180° F. (82° C.).

In certain instances, a laminated window must exhibit a certain level of adhesion, for example, when the laminated window is used as an automotive windshield in the United States. In a non-limiting embodiment, the degree of adhesion exhibited by the laminated window ranges from 1 pound to 10 pounds per lineal inch ($1.75 \times 10^2$ N/m to $1.75 \times 10^3$ N/m) as determined by a 90° Peel Test according to NASA TECH BRIEF 65-10173. This level of adhesion is low enough to allow sufficient interlayer to release from the glass so that it can stretch without tearing to absorb impacting energy. Further, this level of adhesion is high enough to sufficiently retain any broken glass. Higher degrees of adhesion, that is, much higher than 10 pounds per lineal inch ($1.75 \times 10^3$ N/m), results in decreases in impact resistance and higher severity indices, as will be described later.

When a laminated window is subject to adhesion requirements, not only must it exhibit an initial degree of adhesion within a prescribed range, the degree of adhesion should also be relatively stable under a wide range of temperature and humidity conditions. By relatively stable under a wide range of temperature and humidity conditions, it is meant that although there may be fluctuations in the adhesive value over a period of time, the degree of adhesion as determined by NASA TECH BRIEF 65-10173 remains within 1 pound to 10 pounds per lineal inch ($1.75 \times 10^2$ N/m to $1.75 \times 10^3$ N/m) after exposure to temperatures ranging from −50° F. to 120° F. (−46° C. to 49° C.) and relative humidities ranging from 0 to 100 percent for at least 5 days.

In order to produce a laminated window that exhibits the required level of adhesion, various adhesion promoters and/or adhesion inhibitors can be included in the reaction mixture. In this way, a desirable level of adhesion is provided initially and that level of adhesion is maintained under various conditions, such as extremely high humidity conditions. According to the present invention, suitable adhesion promoters include, but are not limited to, alkoxy silanes, such as glycidyl-oxypropyltrimethoxy silane sold by the Dow Corning Company (Midland, Mich.) under the trademark Z-6040®, and gamma-glycidoxy propyltrimethoxy silane. In a non-limiting embodiment, the adhesion promoter is present in a concentration ranging from 0.05 to 0.12 percent by weight of the reaction mixture.

In a non-limiting embodiment of the present invention, where the adhesive properties of reaction mixture are too high, adhesive inhibitors can be used.

According to the present invention, a suitable adhesion inhibitor is stearyl acid phosphate. In a non-limiting embodiment, the adhesion inhibitor is present in a concentration ranging from 0.05 to 0.12 percent by weight of the reaction mixture.

The laminated window of the present invention may exhibit good sound attenuation properties.

EXAMPLES

The present invention is illustrated by the following non-limiting examples.

Example 1

Example 1 is an interlayer comprising a polyurethane polymer material including a solar control component comprising an organometallic tungsten phosphate dye.

The organometallic tungsten phosphate dye was made in the following manner: 1 mole of tungsten hexachloride and 3 moles of dibutylphosphoric acid ester were charged into a reaction flask containing methylene chloride solvent. The weight percent of the tungsten hexachloride and dibutylphosphoric acid was 50% of the mixture by weight. The reaction flask was fitted with a condenser and placed in a heating mantle. The solution was refluxed for 4 hours and filtered. The filtrate was then washed several times with water to remove all of the hydrochloric acid.

An octahedral organometallic dibutyltungsten phosphate complex having a grayish-blue color was formed during the reaction. The compound was dried in a vacuum oven at 2 mm pressure and 180° F. (82° C.) overnight (i.e., approximately 13 hours).

The interlayer of Example 1 was made by dissolving 2% by weight of the octahedral organometallic dibutyltungsten phosphate complex was into 400 grams of acrylate polyol, such as polyhydroxypropylacrylate. 100 grams of Desmodur 3400, a cycloaliphatic diisocyanate commercially available from Bayer Corporation (Pittsburgh, Pa.), was added to the mixture as a crosslinker for the acrylate. The resulting mixture had a viscosity of approximately 2000 centipoise mixture. Next, 20 ppm of dibutyltin dilaurate was added as a catalyst and 0.5 grams of Z-6040® glycidyl-oxypropyltrimethoxy silane were added as internal adhesion coupling agents.

The resulting solution was then injected between two plies of 1.2 mm (0.047 inches) release-coated clear glass and thermally cured for 4 hours at 82° C. (180° F.) to form a 0.123 inch (0.312 cm) thick interlayer. After curing, the interlayer was separated from the glass plies, and the optical properties of the interlayer was measured using a Perkin Elmer Lambda 19 spectrophotometer with a 150 mm labsphere integrating sphere. The results of the measurements are contained in Table 1.

Example 2

The interlayer of Example 2 comprised a polyurethane polymer material including a solar control component comprising an organometallic tungsten phosphate dye. Example 2 was formed using the same procedure described above for Example 1, except 4% of the octahedral organometallic dibutyltungsten phosphate complex was dissolved into the acrylate polyol.

The resulting solution was then injected between two plies of 1.2 mm (0.047 inches) release-coated clear glass and thermally cured for 4 hours at 82° C. (180° F.) to form a 0.116 inch (0.294 cm) thick interlayer. After curing, the interlayer was separated from the glass plies, and the optical properties of the interlayer was measured using the spectrophotometer described above. The results of the measurements are contained in Table 1.

Example 3

The 0.117 inch (0.298 cm) thick interlayer of Example 3 comprised a polyurethane, polyurethane acrylate, or polyacrylate polymer material including a solar control component comprising dibutyltungsten phosphate dye.

The dibutyltungsten phosphate dye was made in the following manner: 840 grams of dibutyl ester of phosphoric acid, 396 grams of tungsten hexachloride and 500 ml of dichlorobutane were added to a flask fitted with a condenser and a thermometer. A nitrogen blanket was placed around the flask to prevent premature hydrolysis of the tungsten compound.

The mixture was refluxed for 4 hours to yield a royal blue organometallic dye. The solution was then filtered and washed with deionized water to yield the finished tungsten dye. The dye was dried overnight in vacuum oven at a 60° C.

The interlayer of Example 3 was made from a reaction mixture comprising 340 grams of 1,000 molecular weight polycaprolactone polyol, 1.79 grams of trimethylolpropane and 131 grams of DESMODUR® W which is a cycloaliphatic diisocyanate commercially available from Bayer Corporation (Pittsburgh, Pa.). The polymer material had a urethane content of 12.4 wt. %.

TABLE 1

| Optical Properties of Exemplary Interlayers | | | | | |
|---|---|---|---|---|---|
| | Ex. 1 (0.312 cm) | Ex. 2 (0.294 cm) | Ex. 3 (0.298 cm) | Solextra ® glass (0.315 cm) | Solex ® glass (0.320 cm) |
| Visible Light Transmittance [%] | 79.87 | 62.80 | 60.20 | 71.34 | 82.04 |
| Total Solar Ultraviolet Absorbance [%] | 0.00 | 0.01 | 0.01 | 53.53 | 56.67 |

TABLE 1-continued

Optical Properties of Exemplary Interlayers

|  | Ex. 1 (0.312 cm) | Ex. 2 (0.294 cm) | Ex. 3 (0.298 cm) | Solextra ® glass (0.315 cm) | Solex ® glass (0.320 cm) |
|---|---|---|---|---|---|
| Total Solar Infrared Absorbance [%] | 43.78 | 18.25 | 9.3 | 11.75 | 46.40 |

*Solex ® glass and Solextra ® glass are commercially available from PPG Industries, Inc. (Pittsburgh, PA).

As shown in Table 1, interlayers of a polyurethane polymer material having a thickness range from about 0.294 cm to 0.312 cm can be made according to the present invention that exhibit the following performance properties: a visible light transmittance ranging from equal to or greater than 60% to equal to or greater than 79%; a total solar ultraviolet absorbance that is less than 1%; and a total solar infrared absorbance ranging from equal to or greater than 9% to equal to or greater than 43%. Also, Table 1 shows the performance of the various exemplary interlayers as compared to the performance of two commercially available glass sheets. The interlayer of Example 1 exhibits a total solar infrared absorbance very similar to that exhibited by a sheet of Solex® glass having a thickness of 0.320 cm. The interlayer of Example 3 exhibits a total solar infrared absorbance very similar to that exhibited by a sheet of Solextra® glass having a thickness of 0.315 cm.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

I claim:

1. A method for forming a tri-layer laminated window comprising:
   a) assembling a mold comprising two plies that make up a laminated window, the plies being a predetermined distance apart and the plies selected from glass, plastic, or one of each;
   b) filling the mold by a non-extrusion process with a reaction mixture for forming a polymer material;
   c) adding one or more solar control components to the reaction mixtures while the polymer material is being formed, the solar control components selected from the group consisting of molybdenum dibutyl phosphate, hydroxyl phenyl benzotriazole, organometallic tungsten dyes, lanthanum hexaboride (LaB$_6$) nanosized particles, and combinations thereof; and
   d) curing the reaction mixture to adhere the two piles together with a degree of adhesion in the range of 1 pound to 10 pounds per lineal inch, wherein the laminated window has a visible light transmittance of at least 70% and haze no greater than 0.5%, and wherein the reaction mixture forms an interlayer between the two plies.

2. The method according to claim 1, wherein the polymer material has a modulus of elasticity ranging from 500 psi to 200,000 psi.

3. The method according to claim 1, wherein the solar control components are selected from lanthanum hexaboride (LaB$_6$) nanosized particles.

4. The method according to claim 3, wherein the nanosized particles are added to the reaction mixture in an amount ranging from 1 to 20 wt.% of the reaction mixture.

5. The method according to claim 1, wherein the solar color component is selected from organometallic tungsten.

6. The method according to claim 1, wherein the organometallic tungsten comprises dibutyl tungsten phosphate.

7. The method according to claim 5, wherein the organometallic tungsten ranges from 0.5 to 3 wt.% of the reaction mixture.

8. The method according to claim 1, wherein the solar control component is selected from molybdenum dibutyl phosphate.

9. The method according to claim 8, wherein the molybdenum dibutyl phosphate ranges from 0.5 to 4 wt.% of the reaction mixture.

10. The method according to claim 1, wherein curing the reaction mixture is accomplished by thermal curing, curing using ultraviolet light, or a combination of both thermal and ultraviolet light curing.

11. The method according to claim 1, wherein the polymer material comprises at least one of a polyurethane, a polyurethane acrylate, a polyacrylate, or mixtures thereof.

12. The method according to claim 1, wherein the solar control components are selected from organometallic tungston dyes prepared by reacting tungsten hexachloride with alkyl esters of phosphoric acid, wherein the organometallic tungsten dyes are UV stable.

13. A method for forming a multi-ply laminated window comprising:
   a) assembling a mold comprising two plies that make up a laminated window the plies being a predetermined distance apart and the plies selected from glass, plastic, or one of each;
   b) filling the mold by a non-extrusion process with a reaction mixture for forming a polymer material;
   c) adding one or more solar control components to the reaction mixture while the polymer material is being formed the solar control components selected from the group consisting of molybdenum dibutyl phosphate, hydroxyl phenyl-benzotriazole, organometallic tungsten dyes, and combinations thereof; and
   d) curing the reaction mixture to adhere the two piles together with a degree of adhesion in the range of 1 pound to 10 pound per lineal inch, wherein the laminated window has a visible light transmittance of at least 70% and haze no greater than 0.5%, and wherein the reaction mixture forms an interlayer between the two piles.

14. The method of claim 1, wherein the solar control components are selected from the group consisting of molybdenum dibutyl phosphate, organometallic tungsten dyes, and combinations thereof.

15. The method of claim 13, wherein the solar control components are selected from the group consisting of molybdenum dibutyl phosphate, organometallic tungsten dyes, and combinations thereof.

* * * * *